(12) United States Patent
Netzel et al.

(10) Patent No.: US 7,143,954 B2
(45) Date of Patent: Dec. 5, 2006

(54) SHORT-CIRCUITING DEVICE FOR AN ELECTRIC RAILWAY SYSTEM HAVING A CONDUCTOR RAIL FOR SUPPLYING POWER TO DRIVE THE VEHICLES

(75) Inventors: Timo Netzel, Dessau (DE); Gerd Bittlingmayer, Berlin (DE)

(73) Assignee: Alcan Technology & Management Ltd., Neuhausen (CH)

( * ) Notice: Subject to any disclaimer, the term of this patent is extended or adjusted under 35 U.S.C. 154(b) by 188 days.

(21) Appl. No.: 10/750,388

(22) Filed: Dec. 31, 2003

(65) Prior Publication Data

US 2004/0223280 A1 Nov. 11, 2004

(30) Foreign Application Priority Data

Jan. 13, 2003 (CH) .................................... 0045/03

(51) Int. Cl.
*B60M 5/02* (2006.01)

(52) U.S. Cl. ...................... 238/14.05; 439/92

(58) Field of Classification Search ............. 238/14.05, 238/14.2, 14.13, 14.14; 439/864, 92, 104, 439/100, 777, 789, 863, 299, 300, 338, 346, 439/372; 104/274

See application file for complete search history.

(56) References Cited

U.S. PATENT DOCUMENTS 3,840,843 A * 10/1974 Izraeli .................. 439/180

FOREIGN PATENT DOCUMENTS

GB    2 100 290 A    12/1982
NL    9 401 040     2/1996

* cited by examiner

*Primary Examiner*—Mark T. Le
(74) *Attorney, Agent, or Firm*—Klaus P. Stoffel; Wolff & Samson, PC

(57) ABSTRACT

A short circuiting device for an electric railway system having a conductor rail for supplying electric power to drive the vehicles. The function of the device is to provide a short circuit between a track rail and the conductor rail. The short circuiting device contains a first contact element providing a face to make contact with the track rail and a contact arm that is coupled to the contact element via a jointed connection and has a contact face for making contact with the conductor rail. The jointed connection is a multi-hinged connecting facility containing two levers which are joined to each other via a knee-type joint and joined via the respective first and second connection hinges to the contact element and the contact arm. One of the levers is in the form of a closing lever and the shape and arrangement of the levers and hinged joints is such that by executing a rotational movement with the closing lever, and via this, movement of the knee-type joint about the axis of the connection hinge related to the closing lever, the contact element and the contact arm can be brought together thus making electrical contact.

15 Claims, 3 Drawing Sheets

SHORT-CIRCUITING DEVICE FOR AN ELECTRIC RAILWAY SYSTEM HAVING A CONDUCTOR RAIL FOR SUPPLYING POWER TO DRIVE THE VEHICLES

BACKGROUND OF THE INVENTION

The invention relates to a short-circuiting device for an electric railway system having a conductor rail for supplying electric power to drive the vehicles. The function of the device is to provide a short circuit between a track rail and the conductor rail. The short circuiting device contains a first contact element providing a face to make contact with the track rail and a contact arm that is coupled to the contact element via a jointed connecting means and has a contact face for making contact with the conductor rail.

In contrast to interregional railway networks where power transfer takes place via overhead catenary systems, the transfer of power on underground railways (U-Lines) or City Lines normally takes place by way of a conductor rail. Such a conductor rail may e.g. be in the form of a rail mounted at the side of the track rails. The conductor rail may thereby be arranged in such a manner that the power collector makes sliding contact with the conductor rail from underneath, from the side or from above.

As a safety measure, when performing any kind of work on railway systems that have the above mentioned conductor rails, not only is the power supply to the conductor rail disconnected but a safety device is also installed i.e. a so called short-circuiting device which short-circuits the conductor acting as the positive pole with the rail acting as the minus pole—usually one of the track rails. This way, a short circuiting means, also called an earthing short circuit facility, creates an electrically conductive connection to conduct the electric current away when a handling error occurs, thus protecting the life of anyone involved.

To that end the above mentioned short circuiting device is installed before and after the place of work in order to protect the workplace and to prevent the flow of short circuit current on all sides.

A short circuiting device employed at present is made up of two arms that are coupled together via a hinge-type joint, whereby a first arm forms a contact arm which in the operating position lies horizontal and features a contact finger making contact with the conductor rail, and a second arm forms a base arm which lies vertical in the operating position and has a contact shoe resting on the rail track. In the operating position, the contact arm is pressed against the conductor rail by means of a tension spring which is hinged to the base arm and exercises a tensile force vertical to the conductor rail.

One of the disadvantages of the present-day short circuit devices is that their short circuit resistance is too low. As a rule the short circuit resistance of present-day short circuit devices lies at around 30 kA after a switch off time of 23 ms. The dimensioning of the electric equipment on railway systems is, however, often based on short circuits with power levels of 50 to 60 kA.

Short circuit devices, which are exposed to a higher level of current when a short circuit occurs, are as a rule destroyed or at least seriously damaged. The reason for this is e.g. that the cross-section of the conductor has been under-dimensioned and the conductive elements are thermally destroyed when the level of current flowing is too high. Further, circuit breakers of present-day design are normally catapulted away which, because of the risk of injury, is undesirable.

SUMMARY OF THE INVENTION

The object of the present invention is therefore to provide a short circuiting device which on the one hand is able to conduct away higher levels of current and, when short circuiting occurs, is as much as possible not destroyed and is not catapulted away.

Pursuant to this object, and others which will become apparent hereafter, one aspect of the present invention resides in the hinged connecting means being constructed as a multi-hinged connecting means containing two levers which are joined to each other via a knee-type joint, and joined via the respective first and second connection hinges to the contact element and the contact arm. One of the levers is in the form of a closing lever and the shape and arrangement of the levers and hinge connection is such that by executing a rotational movement with the closing lever, and via this movement of the knee-type hinge about the axis of the connecting hinge, the contact element and the contact arm can be brought together thus making electrical contact.

Normally, the rotational movement of the closing lever causes the distance between the first and second connecting hinge to be reduced by bringing together the contact element and the contact arm.

In a preferred embodiment of the invention the multi-hinged connection contains a closing lever coupled by means of a first connecting hinge to the contact element and a connecting lever coupled to the contact arm by means of a second connecting hinge. Both levers are coupled to each other via the knee-type hinge.

The multi-hinge connection may however, also be designed so that it contains a closing lever coupled to the contact arm by means of a connecting hinge and a connecting lever coupled to the contact element via a further connecting hinge. Both levers are coupled to each other via the knee-type hinge.

The short circuiting device can be attached to the track rail via a first and second clamping jaw, whereby the multi-hinged connection is designed so that, on making electrical contact between the contact element and the contact arm, the short circuiting device can be clamped tightly to the track rail on reducing the distance between the first and second clamping jaw. Thereby the clamping jaws act as a kind of gripping device and are attached to the track rail.

The first clamping jaw is preferably part of the contact element and the second clamping jaw facing the first clamping jaw is preferably part of the contact arm. In an advantageous embodiment of the invention the second clamping jaw is a component mounted on the end section of the contact arm facing the track rail at an angle, in particular essentially at a right angle.

The contact faces of both clamping jaws are preferably suited to the outer contour of the track rail, so that when the short circuiting device has been installed the clamping jaws fit as closely as possible to the track rail and exercise an optimal clamping effect. Further, the closest possible fit of the clamping jaws on the track rail increases the area of contact and with that the conductor cross-section.

The electrical contact between the track rail and the short circuiting device is preferably made exclusively via the contact elements i.e. via the first clamping jaw of the contact element. The contact element or the clamping jaw is therefore made to be electrically conductive, so that the electrically conductive connection from the track rail to the contact arm or the conductor rail is made preferably exclusively via the contact element. The second clamping jaw of the contact arm which, when making contact rests against the track rail, advantageously makes no electrical contact with the track rail. The second clamping jaw is usefully partially or completely electrically insulated.

The multi-hinged connection means functions preferably after the known principle of tension locking such as one finds e.g. for buckle or strap-type fasteners.

The multi-hinged connection means is usefully designed such that the electrical contact between the contact element and the contact arm is made by rotating the locking lever into a self-inhibiting position. The self-inhibiting position prevents the electrical contact from opening by itself.

The self-inhibiting action is achieved by the closing lever and the connecting lever being coupled together via the knee-type hinge in such a manner that, in order to make electrical contact, the closing lever can be moved by exercising a rotational movement about the axis of the first connecting hinge until reaching a dead point characterised by minimum distance between the first and second connecting hinge, and, in order to create the self-inhibiting of the closing lever, is moved by continuing the rotational movement beyond the dead point into an end position. Thereby, the knee-type hinge, with the closing lever, completes a rotational movement about the related first connecting hinge. The snapping or swinging over into the self-inhibiting end position may be achieved by means of a slight enlargement of the distance between the first and second connecting hinge, whereby as a rule the elasticity of the interacting elements also plays a role.

In the self-inhibiting position the multi-hinged joint acts as a closing facility under tension which can be released again only by exercising a rotational movement with the closing lever in the opposite direction using the elbow-joint resp. knee-lever principle.

In the closed position the closing lever may lie against a stop on the contact element on which the closing lever lies in the self-inhibiting position. Further, it is also conceivable for means for holding the closing lever in the self-inhibiting position to be provided. In addition, the multi-hinged connection may also exhibit a tension spring.

In a further embodiment, the contact arm contains an electrically insulated contact arm housing in which an electrically conductive element—the so-called power transfer element—is arranged. The power transfer element is furthermore coupled to an exposed contact face for providing electrical contact with the conductor rail. In this version the contact element preferably contains a sliding arm at least part of which is mounted in the insulated contact arm housing where it moves or is guided in a sliding manner. In order to make electrical contact, upon actuating the closing lever in the contact arm housing, the contact element is pushed along with its sliding arm in the direction of the power transfer element until the sliding arm touches the power transfer element, thus making electrical contact.

The power transfer element of the contact arm is preferably a profiled metal section, in particular a hollow section. The power transfer element of the contact arm may e.g. be an extruded metal section. In a preferred version the metal section is in the form of a rectangular section. The power transfer element may be e.g. of iron, steel, copper and in particular aluminium or an aluminium alloy.

The cross-section of the metal section may be dimensioned in accordance with the amount of current to be expected, so that it is possible with a short circuiting device according to the invention to withstand mechanically and electrically a short circuit for all levels of current that can be expected i.e. if short circuiting occurs, with appropriate dimensioning of the power transfer element, the short circuiting device according to the invention will withstand current levels over 200 kA without suffering damage.

In a preferred version, the contact element is made up essentially of a first clamping jaw and a sliding arm connected to it. The clamping jaw and the sliding arm are preferably both electrically conductive, whereby the components on the faces that are not part of the contact face may be partly or wholly covered with electrical insulation.

In another embodiment, the multi-hinge connection is in the form of a bracket-shaped construction. This is characterized in that on both sides of the short circuiting device closing levers are provided. The levers are connected via a connecting element to a bracket, which forms a kind of handgrip.

The second hinge connections of the contact arm are preferably mounted on the contact arm housing. The first hinge connections of the contact element may be in the form of axle connections penetrating the contact element.

In the region of its contact face to the positive pole and/or in the region of its contact face to the minus pole, the short circuiting device may also exhibit a magnet which provides adhesion of the contact area to the corresponding positive or minus pole.

Further, the short circuiting device may—with the exception of the contact areas—be clad with an electrically insulating material, preferably a plastic.

For the installation of the short circuiting device, this is assigned via its clamping jaws to the track rail, whereby because of its weight the contact arm is inclined towards the ground and therefore does not yet make contact with the conductor rail. In a further step the closing lever is led via a rotational movement downwards in the direction of the track rail, whereby the contact element with its sliding arm in the contact arm housing is pushed onto the power transfer element making electrical contact with it. At the same time the first clamping jaw of the contact element is pushed to the second clamping jaw of the contact arm, whereby the track rail is clamped between the clamping jaws in such a manner, that the contact arm is lifted and comes with its contact face into contact with the conductor rail making electrical contact.

If the closing lever is put into the self-inhibiting position, then the contact made by the short circuiting device remains without having to take any measures to that end. The short circuiting device according to the specific version described above find application in power supply systems in which sliding contact with the conductor rail is made from beneath.

Because of the different design of the short circuiting device according to the invention, it exhibits various safety aspects that prevent the operator from accidentally coming into contact with current carrying elements as a result of mistakes during its installation. On the one hand the current can flow between the track rail and the conductor rail only via the first clamping jaw of the contact element. The first clamping jaw may, however, conduct electric current only if contact is made between both the contact element and the contact arm and between the contact arm and the conductor rail. This is the case only after actuating the closing lever i.e. when the short circuiting device has been fully installed, the closing lever is in the self-inhibiting position and no further handling of the short circuiting device is necessary.

As, during the installation, no electrical contact is made between the contact element and the contact arm nor between the contact arm and the conductor rail, neither the track rail nor elements of the short circuiting device conduct electrical current during installation.

The design of the short circuiting device may also be made for power supply systems in which the current collector makes sliding contact with the conductor rail at its side or from above.

The short circuiting device according to the invention is also suitable as a portable device for everyday use. So, for example, the short circuiting device may be carried by railway personnel, in order to create a short circuit on purpose in emergency situations. This could be the case when unauthorized persons are standing in the region of the electrical units of the railway system.

For a more complete understanding of the short-circuiting device of the present invention, reference is made to the following detailed description and accompanying drawings in which the presently preferred embodiments of the invention are illustrated by way of example. That the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

DETAILED DESCRIPTION OF THE INVENTION

Figure 1:
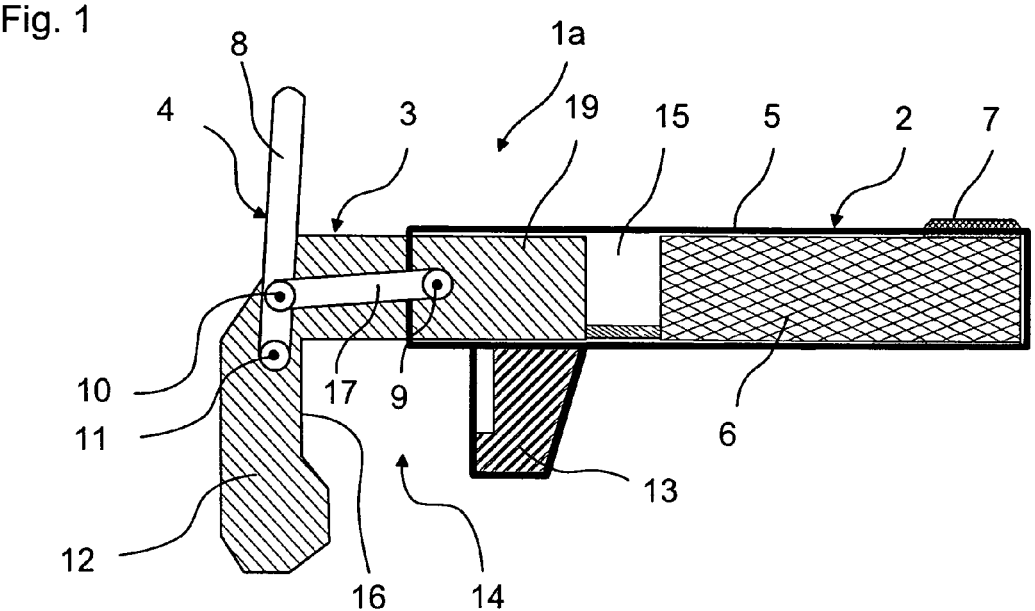
FIG. 1 is a schematic cross-sectional representation of the inventive short-circuiting device.

FIG. 1 shows a schematic representation of a short circuiting device 1a according to the invention. The short circuiting device 1a contains a contact arm 2 and a contact element 3, which are coupled via a multiple-hinge connection 4. The contact arm 2 comprises a contact arm housing 5, which is electrically insulated, and a power conducting element 6 which runs into the contact arm housing 5 and is coupled to a contact face 7 of the conductor rail (not shown here). The contact element 3 is in the form of an electrically conductive component with a contact face 16 to the track rail. The contact element 3 features a first clamping jaw 12 and a sliding arm 19 joined to the first clamping jaw 12. Situated opposite the first clamping jaw 12 is a second clamping jaw 13 which is a component part of the contact arm 2. The second clamping jaw 13 is electrically insulated and, correspondingly, features no electrically conductive contact areas. Both clamping jaws 12, 13 are arranged in a pincher-like manner and form a space 14 in which the track rail (not shown here) is situated when the short circuiting device has been installed.

The two clamping jaws 12, 13 exhibit a gripping profile which matches the outer profile of the track rail.

The multi-joint connection 4 contains a closing lever 8, which is coupled to the contact element 3 via a first connecting joint 11. Further, the multi-joint connection 4 contains a connecting lever 17 which is coupled to the contact arm 2 via a second connecting joint 9. In the present example the connecting lever 17 is coupled to the contact arm housing 5 of the contact arm 2. The closing lever 8 and the connecting lever 17 are also coupled to each other via a knee-type joint 10. The knee-type joint is thereby arranged such that, when the closing lever 8 performs a rotational movement and the knee-type joint 10 moves around the axis of the first connecting joint 11, the distance between the first and second joints 11, 9 is reduced at the same time making contact between the contact element 3 and the power transfer element 6 of the contact arm 2.

As a result of this process the space 14 is made smaller and, as a consequence, the short circuiting device 1 is clamped simultaneously to the track rail running through it. Consequently, not only is electrical contact made between the contact element 3 and the power transfer element 6 of the contact arm 2, but also electrical contact is made between the contact face 16 of the contact element 3 and the track rail. This double contact ensures double safety.

Also, by the clamping of the short circuiting device to the track rail the front end of the unsupported inclined contact arm 2 facing the conductor rail is raised vertically and the contact face 7 pressed onto the underside of the conductor rail, resulting in contact with the conductor rail.

Figure 3:
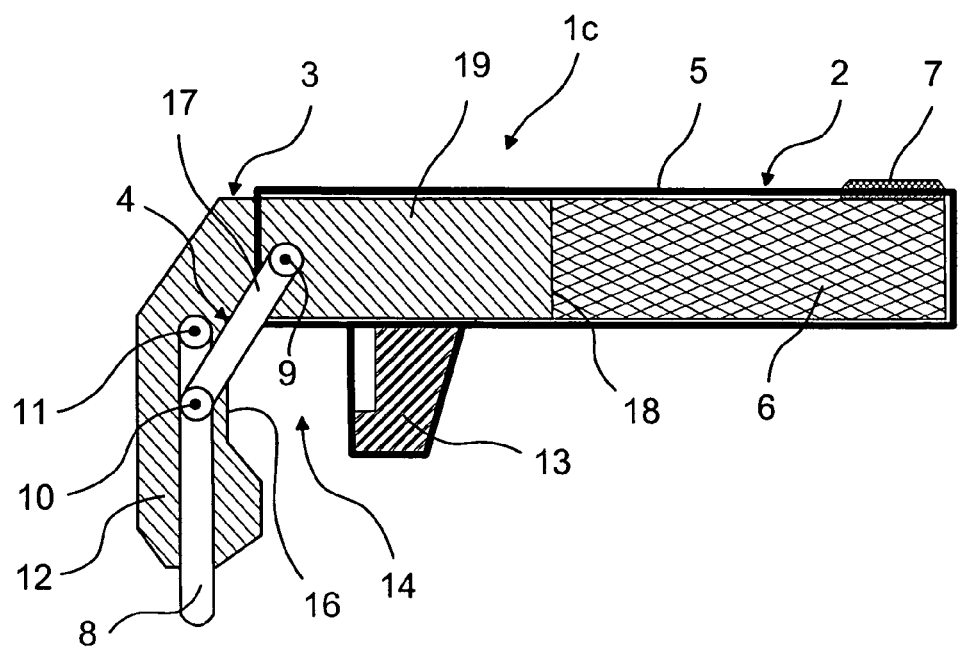
FIG. 3 shows the short-circuiting device in the closed or locket position.

FIGS. 1 and 3 show the principle whereby the short circuiting device makes electrical contact between conductor rails and track rails in various stages of assembly of the short circuiting device 1a, 1b, 1c.

Figure 2:
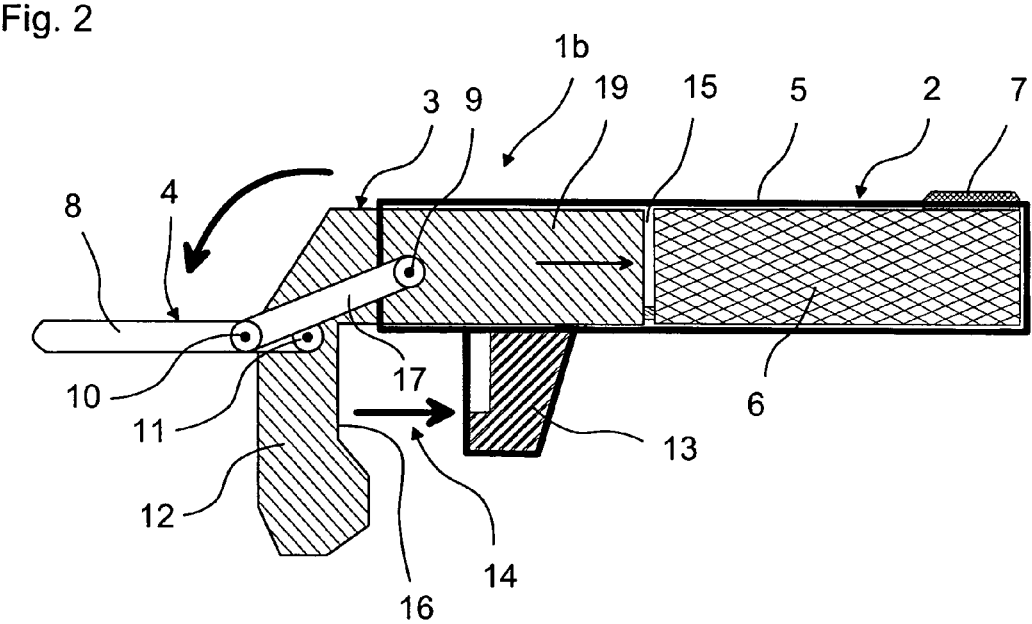
FIG. 2 is a view as in FIG. 1 where the closing lever is initially rotated.

The short circuiting device 1a is set onto the track rail with space 14 formed by the clamping jaws 12, 13. Subsequently, the closing lever 8 is rotated about the axis of the connecting hinge 11 away from the contact arm 2 (FIG. 2). The closing lever 8 is led beyond the dead-point to a stop in a self-inhibiting position. In this position, the closing lever 8 is usefully resting against the contact arm 3.

In this process three events are initiated. First, the sliding arm 19 of the contact element 3 is pushed into the contact arm housing 5 of the contact arm and, as a result, contact 18 is made between the contact element 3 and the power transfer element 6 of the contact arm 2 by reducing distance 15. Second, the track rail is clamped securely by passing the two clamping jaws 12, 13 in space 14, and thirdly, the contact arm 2 is raised vertically by clamping the track rail between the clamping jaws 12, 13, with the result that the contact face 7 comes to rest on the conductor rail making electrical contact.

Figure 4:
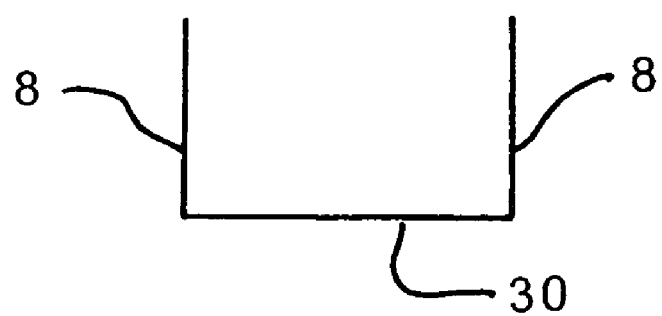
FIG. 4 is a schematic representation of a handgrip in connection with closing levers.

FIG. 4 shows a schematic in which connecting element 30, forming a handgrip, is connected to closing levers 8 located on both sides of the short circuiting device.

While the short-circuiting device has been described in conjunction with specific embodiments, it is evident that many alternatives, modifications and variations will be apparent to those skilled in the art in light of the disclosure herein. It is intended that the meets and bounds of the invention be determined by the appended claims rather than by the language of the above specification, and that all such alternatives, modifications and variations which form a function or co-jointly or cooperative equivalent are intended to be included within he spirit and scope of these claims.

What is claimed is:

1. A short circuiting device for an electric railway system having a conductor rail for supplying electric power to drive railway vehicles, the function of the device being to provide a short-circuit between a track rail and the conductor rail, the short circuiting device comprising;

a first contact element having a face contactable with the track rail;

a contact arm that has a contact face contactable with the conductor rail; and hinged connecting means for coupling the contact arm with the contact element, the hinged connecting means including a multi-hinged connection having two levers which are joined to each other via a knee joint and joined respectively via first and second hinged connecting joints to the contact element and the contact arm, one of the levers is formed as a closing lever, the levers and the hinged connection joints being shaped and arranged so that by executing a rotational movement with the closing lever the knee joint moves about an axis of the first hinged connection joint which is assigned to the closing lever and the contact element and the contact arm, in a position of electrically insulating from each other, are brought together to make electrical contact.

2. A short circuiting device according to claim 1, wherein the multi-hinged connection includes the closing lever which is coupled to the contact element by the first hinged connecting joint, and a connecting lever which is coupled to the contact arm by the second hinged connecting joint which is on the contact arm, both the levers being coupled together via the knee joint.

3. A short circuiting device according to claim 1, wherein the multi-hinged connection means includes the closing lever coupled to the contact element by one of the connection joints and a connecting lever coupled to the contact arm by a further of the connection joints, both levers being coupled together via the knee joint.

4. A short circuiting device according to claim 1, wherein the contact element forms a first clamping jaw and the contact arm forms a second clamping jaw, the short circuiting device being attachable to the track rail by the first and second clamping jaws, the multi-hinged connection means being configured so that on making electrical contact between the contact element and the contact arm, the short circuiting device is clamped securely onto the track rail by reducing a distance between the first and second clamping jaws.

5. A short circuiting device according to claim 1, wherein the multi-hinged connection means is configured to make the electrical contact between the contact element and the contact arm by having the knee joint is movable with its axis through a rotational movement of the closing lever about the first connection joint into a self-inhibiting end position which hinders the electrical contact from opening by itself.

6. A short circuiting device according to claim 1, wherein the closing lever and the connecting lever are coupled together via the knee joint so that, in order to establish contact, the closing lever is movable until it reaches a dead-point by exercising a rotational movement about the axis of the related first connection joint and, by continuing the rotational movement, the closing lever is movable into a self-inhibiting closed position on exceeding the dead point position.

7. A short circuiting device according to claim 6, wherein the closed position is defined by an end stop on the contact arm on which the closing lever can be brought to rest on exceeding the dead-point.

8. A short circuiting device according to claim 4, wherein the contact element is electrically conductive and, in a position in which the contact element makes contact with the contact arm, electrical contact is made via the first clamping jaw from the track rail to the contact arm, and the second clamping jaw of the contact arm is insulated and no electrical contact can be made between the track rail and the contact arm.

9. A short circuiting device according to claim 4, wherein the second clamping jaw is a component mounted on an end part of the contact arm at an angle.

10. A short circuiting device according to claim 9, wherein the second clamping jaw is mounted at a right angle so as to face the first clamping jaw.

11. A short circuiting device according to claim 1, where the contact arm contains an electrically conductive power transfer element made of a metal profiled section.

12. A short circuiting device according to claim 11, wherein the power transfer element is a hollow metal profiled section.

13. A short circuiting device according to claim 11, wherein the power transfer element is an extruded aluminum section.

14. A short circuiting device according to claim 11, wherein the contact arm includes an electrically insulated contact arm housing, in which the power transfer element is situated, and the contact element includes a sliding arm which is slideably mounted at least partially in the contact arm housing for making electrical contact with the power transfer element.

15. A short circuiting device according to claim 1, wherein the multi-hinged connection includes, on both sides of the short circuiting device, closing levers connected via a connecting element so as to form a handgrip.

* * * * *